US012726976B2

(12) United States Patent
Padaki et al.

(10) Patent No.: US 12,726,976 B2
(45) Date of Patent: Sep. 1, 2026

(54) DOWNLINK AND UPLINK DISAGGREGATION IN A RADIO ACCESS NETWORK

(71) Applicant: EdgeQ, Inc., Santa Clara, CA (US)

(72) Inventors: Gururaj Padaki, Bangalore (IN); Sriram Rajagopal, Karnataka (IN); Vinay Ravuri, Cupertino, CA (US)

(73) Assignee: EdgeQ, Inc., Santa Clara, CA (US)

(*) Notice: Subject to any disclaimer, the term of this patent is extended or adjusted under 35 U.S.C. 154(b) by 1009 days.

(21) Appl. No.: 17/717,032

(22) Filed: Apr. 8, 2022

(65) Prior Publication Data

US 2023/0328720 A1 Oct. 12, 2023

(51) Int. Cl.

| | |
|---|---|
| ***H04W 4/00*** | (2018.01) |
| ***H04L 5/00*** | (2006.01) |
| ***H04W 72/0446*** | (2023.01) |
| ***H04W 72/1268*** | (2023.01) |
| ***H04W 72/52*** | (2023.01) |

(52) U.S. Cl.

CPC ....... *H04W 72/1268* (2013.01); *H04L 5/0051* (2013.01); *H04L 5/0053* (2013.01); *H04W 72/0446* (2013.01); *H04W 72/52* (2023.01)

(58) Field of Classification Search

CPC ......... H04W 72/1268; H04W 72/0446; H04W 72/52; H04W 72/23; H04W 88/085; H04L 5/0051; H04L 5/0053; H04L 5/0044

See application file for complete search history.

(56) References Cited

U.S. PATENT DOCUMENTS 9,215,296 B1 * 12/2015 Akhter .................... H03M 7/30
2015/0092624 A1 * 4/2015 Yao ...................... H04L 1/1671 370/278

(Continued)

FOREIGN PATENT DOCUMENTS

EP 2789206 B1 * 6/2020 ........... H04W 88/08
JP 2008072563 A * 3/2008

(Continued)

OTHER PUBLICATIONS

International Search Report and Written Opinion of the International Searching Authority mailed Aug. 9, 2023 in related PCT application No. PCT/US2023/15589, (10 pgs).

*Primary Examiner* — Edan Orgad
*Assistant Examiner* — Hidayat Dabiri
(74) *Attorney, Agent, or Firm* — Michael North

(57) ABSTRACT

System and method embodiments are disclosed to improve radio access network coverage area, increase throughput, and reduce power consumption in user equipment (UE). Downlink (DL) and uplink (UL) are disaggregated in one or more radio units (RUs). A UE receives DL data packets from a DL RU and uploads UL data packets to a UL RU disaggregated from the DL RU. The UL RU couples to a distributed unit (DU) directly or via the DL RU such that an acknowledgment or error message for successful or unsuccessful reception of the UL data packets may be sent back to the UE via the DL RU. The DU may track a UE motion trajectory and re-map UL traffic from one UL RU to another UL RU. Embodiments of DL/UL disaggregation may improve power efficiency and be advantageous for various applications such as internet of things, cyber physical systems, 5G communications, etc.

17 Claims, 5 Drawing Sheets

Disaggregated Downlink and Uplink

(56) References Cited

U.S. PATENT DOCUMENTS

| | | | | |
|---|---|---|---|---|
| 2016/0156381 | A1* | 6/2016 | Rydström | H04B 7/0413 370/286 |
| 2017/0215188 | A1* | 7/2017 | Kim | H04W 72/0446 |
| 2018/0139011 | A1* | 5/2018 | Chae | H04L 1/1861 |
| 2019/0075560 | A1* | 3/2019 | Takiguchi | H04L 1/188 |
| 2020/0259896 | A1 | 8/2020 | Sachs et al. | |
| 2020/0333424 | A1* | 10/2020 | Shi | H04W 4/02 |
| 2021/0007039 | A1* | 1/2021 | Salahuddeen | H04L 69/164 |
| 2021/0153262 | A1* | 5/2021 | Mochizuki | H04W 56/0045 |
| 2021/0321407 | A1* | 10/2021 | Matsuo | H04L 41/0897 |
| 2022/0061110 | A1* | 2/2022 | Sirotkin | H04W 76/12 |
| 2022/0078734 | A1* | 3/2022 | Zhang | H04L 5/0023 |
| 2022/0109584 | A1 | 4/2022 | Gunasekaran et al. | |
| 2022/0322272 | A1* | 10/2022 | Akkarakaran | H04W 24/10 |
| 2022/0322393 | A1* | 10/2022 | Lin | H04W 72/23 |
| 2022/0368465 | A1* | 11/2022 | Wong | H04L 1/1812 |
| 2023/0121268 | A1* | 4/2023 | Mueller | H04L 41/147 370/229 |
| 2023/0199553 | A1* | 6/2023 | Uziel | H04W 24/02 370/230 |
| 2023/0284210 | A1* | 9/2023 | Abdelghaffar | H04L 5/001 370/329 |
| 2023/0292354 | A1* | 9/2023 | Zaifman | H04W 28/16 |
| 2023/0319864 | A1* | 10/2023 | Ibrahim | H04B 7/06952 370/329 |

FOREIGN PATENT DOCUMENTS

| | | | | |
|---|---|---|---|---|
| WO | WO-2014021772 | A2 * | 2/2014 | H04B 7/022 |
| WO | WO-2020142532 | A1 * | 7/2020 | H04W 76/15 |
| WO | 2022048744 | A1 | 3/2022 | |
| WO | 2022058290 | A1 | 3/2022 | |

* cited by examiner

100

200

Disaggregated Downlink and Uplink

DOWNLINK AND UPLINK DISAGGREGATION IN A RADIO ACCESS NETWORK

TECHNICAL FIELD

The present disclosure relates generally to radio access networks (RANs). More particularly, the present disclosure relates to systems and methods for downlink and uplink disaggregation in a RAN.

BACKGROUND

The importance of wireless communication in today's society is well understood by one of skill in the art. Advances in wireless technologies have resulted in the ability of a communication system to support wireless communications of different standards, e.g., 5G New Radio (NR), 4G LTE, Wi-Fi, etc.

In current RAN deployments, the coverage area for a radio unit (RU) may be limited by the uplink (UL) transmit power of user equipment (UE) or customer premise equipment (CPE). Due to size and/or power restrictions, UEs/CPEs typically have limited uplink transmit power. Compared to UL transmit power of UEs/CPEs, an RU generally has greater downlink transmit power. As a result, a UE/CPE may have enough DL signal strength for a DL connection but not enough UL transmit power to support a stable UL connection. One of the current solutions is to make RUs in the form of small cells, e.g., microcells, picocells, or femtocells, such that the RUs may be located closer to the UEs/CPEs. However, such a solution may not be economical since those small cells need hardware and firmware/software to support both UL and DL connections.

Accordingly, what is needed are systems, devices, and methods that address the above-described issues for improving the RAN coverage and increasing the throughput of the RAN system.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
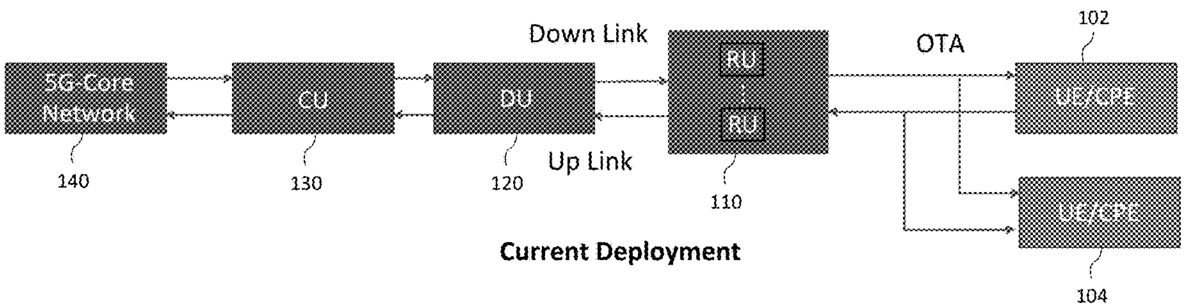
FIG. 1 depicts a block diagram of current RAN deployment with aggregated uplink and downlink.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion, components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. Current RAN Deployment

A RAN is part of a telecommunication system. It may implement one or more radio access technologies (RATs) to provide a connection between a user device, e.g., a mobile phone, and a core network. FIG. 1 depicts a block diagram of current RAN deployment with aggregated uplink and downlink. As shown in FIG. 1, a radio unit (RU) block 110 couples to one or more UEs/CPEs, e.g., 102 and 104, wirelessly or over-the-air (OTA) to support both UP and DL transmissions. The RU block may comprise one or more RUs with each RU coupling to one or more UEs/CPEs. A distribution unit (DU) 120 couples to the RU block for UL/DL scheduling of each RU. The DU couples to a core network (CN) 140, e.g., a 5G CN, via a control unit (CU) 130. In a 5G communication system, the CU provides support for higher layers of the protocol stack, such as Service Data Adaption Protocol (SDAP), Packet Data Convergence Protocol (PDCP), and Radio Resource Control (RRC). The DU supports lower layers of the protocol stack such as Radio link control (RLC), Media Access Control (MAC), and Physical layer.

Given the limited UL transmit power of UEs/CPEs, the RU may be a small cell, e.g., a microcell, a picocell, or femtocell, such that the RU may be placed closer to the UEs/CPEs for UL connections. However, such a solution may not be economical since those small cells need to have the hardware and firmware/software to support both UL and DL connections Described in the following sections are system and method embodiments for downlink and uplink disaggregation in a RAN. The implementation of the disclosed embodiments may increase efficiency for RAN operation.

B. Embodiments of UL and DL Disaggregation

Figure 2:
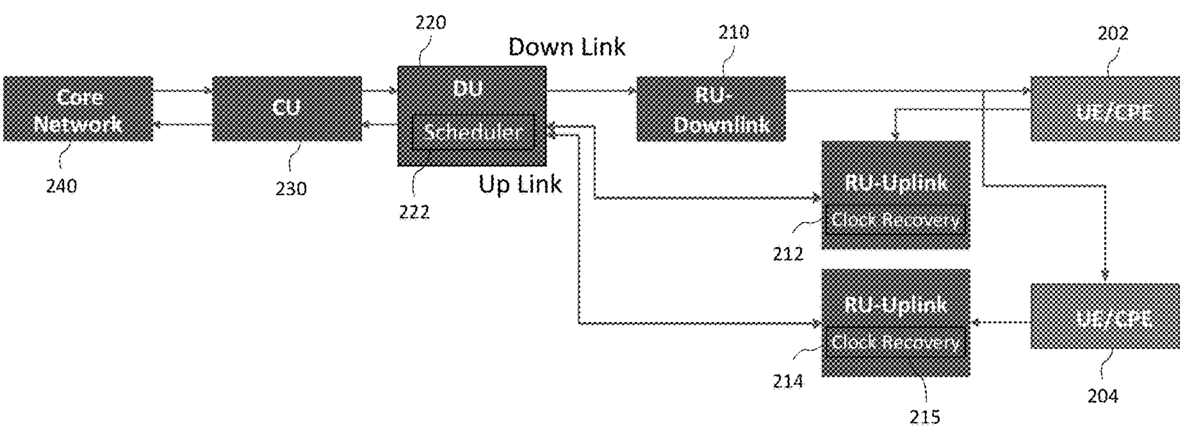
FIG. 2 depicts a block diagram of RAN deployment with disaggregated uplink and downlink, according to embodiments of the present disclosure.

FIG. 2 depicts a block diagram of RAN deployment with disaggregated uplink and downlink, according to embodiments of the present disclosure. As shown in FIG. 2, the UL and DL are disaggregated and implemented separately in separate devices. A DL RU (also referred to as RU-Downlink) 210 couples to one or more UEs/CPEs, e.g., 202 and 204, for DL transmission, while one or more UL RUs (also referred to as RU-Uplink), e.g., 212 and 214, couple to the one or more UEs/CPEs for UL transmission. It shall be noted that although each UL RU respectively couples to a UE in FIG. 2, a UL RU may couple to multiple UEs for multiple UL connections.

In the exemplary RAN 200, a DU 220 couples to a CN 240 via a CU 230. The DL RU 210 and the UL RUs 212 and 214 may couple to the DU 220 via a wired connection, e.g., an Ethernet or fiber-optical connection, or a wireless connection. In an alternative embodiment, the one or more UL RUs 212 and 214 may couple to the DU 220 via the DL RU 210. In other words, the one or more UL RUs may transmit UL data packets to the DU 220 without involving the DL RU 210 or to the DU 220 through the DL RU 210. Likewise, the one or more UL RUs may receive control signals, such as scheduling signals, from the DU 220 without involving the DL RU 210 or from the DU 220 via the DL RU 210. In yet another embodiment, the one or more UL RUs may have a mixed connection layout with some UL RUs coupled to the DU 220 from the DU 220 without involving the DL RU 210, while other UL RUs coupled to the DU 220 through the DL RU 210.

In one or more embodiments, the DU 220 comprises a scheduler 222, which may take UE/CPE locations to map uplink traffic of one UE/CPE to a designated UL RU, among multiple UL RUs, with considerations of asymmetric DL and UL paths on the DU. The designated UL RU may be chosen based on one or more parameters, e.g., the distance of a UL RU to the UE/CPE, current UL load, scheduled UL load, etc. For example, the designated UL RU may be the nearest UL RU or a UL RU not the nearest but with highest available UL bandwidth among all UL RU. The scheduler 222 may use artificial intelligence (AI) or Machine learning (ML) based methodology to map a UE to a UL RU. The location of a UE/CPE may be a fixed position, a current location, or a predicted location based on a moving trajectory or historical location data of the UE. Each UL RU may comprise a clock recovery module 215, which is configured to receive a timing reference signal from the DU for clock recovery and a start of the UL resource allocation for synchronized receiving on the UL RU side and transmitting on the UE/CPE side. In one or more embodiments, a UL RU, once selected by the DU for UL data packet receiving from a UE in a scheduled time slot, may also receive map information from the UE such that the UL RU may selectively decode signals or UL data packets from the UE. In such a configuration, the UL RU does not need to decode all signal received during the scheduled time slot and thus the operation efficiency may be improved.

The UL RU may be a unit of compact size, such as a road-side unit (RSU), a pole-side unit (PSU), a USB dongle or embedded inside a laptop, or a set-top box, etc., for UL only. Without needing to increase DL power, such a DL/UL disaggregation configuration may improve power efficiency and thus be advantageous for various applications, including but not limited to Internet of things (IoT), cyber physical systems, 5G communications, indoor position tracking, etc. Furthermore, the disaggregation of UL and DL may connect a UE/CPE to a UL RU, which is nearby or has available bandwidth to timely schedule an uplink for the UE/CPE. Therefore, uplink connections for multiple UEs/CPEs may be decentralized to use UL resources more efficiently and lower UL latencies.

Figure 3:
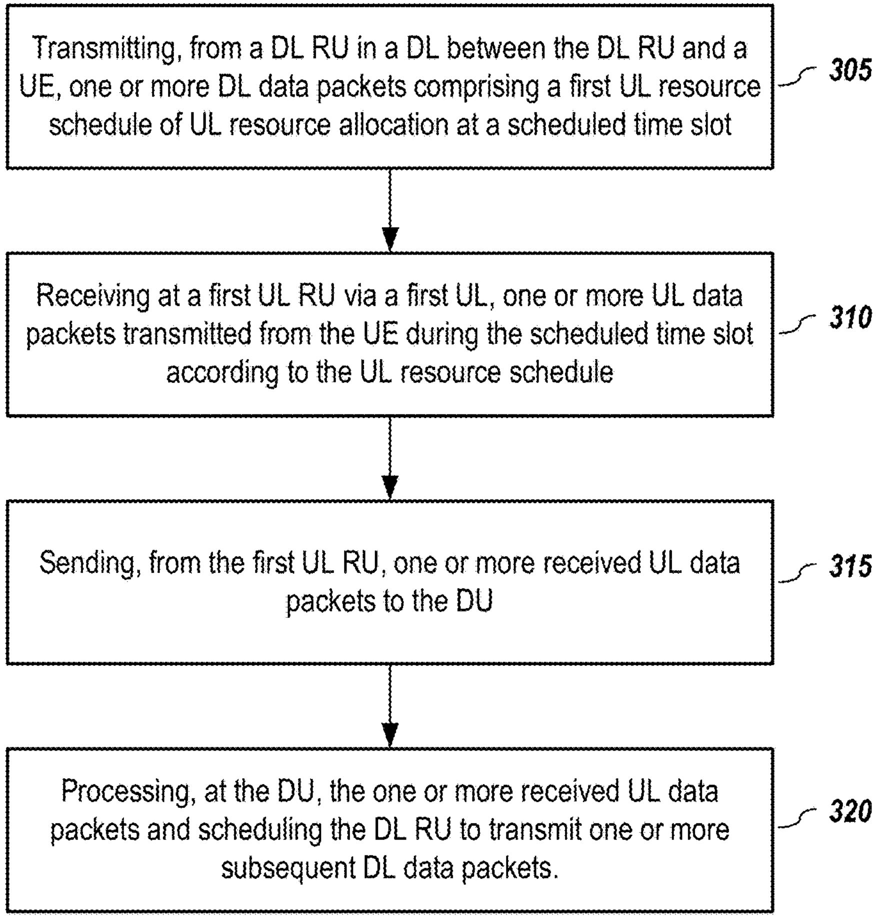
FIG. 3 depicts a process for disaggregating uplink and downlink in a RAN, according to embodiments of the present disclosure.

FIG. 3 depicts a process for disaggregating uplink and downlink in a RAN, according to embodiments of the present disclosure. In step 305, a DL RU sends, in a DL between the DL RU and a UE, one or more DL data packets comprising a first UL resource schedule of UL resource allocation at a scheduled time slot. In step 310, the UE sends one or more UL data packets to a first UL RU, via a first UL between the first UL RU and the UE, during the scheduled time slot according to the first UL resource schedule. The first UL RU may be selected, by the DU, among a plurality of UL RUs based on one or more parameters using AI or ML methodology. In one or more embodiments, the first UL RU may receive a timing reference signal from the DU for clock recovery and a start of the UL resource allocation for synchronized receiving on the UL RU side and transmitting on the UE/CPE side. In one or more embodiments, the first UL RU may also receive map information from the UE such that the first UL RU may selectively decode signals or UL data packets from the UE. In such a configuration, the first UL RU may not need to decode all signals received during the scheduled time slot and thus the operation efficiency of the first UL RU may be improved.

In step 315, the first UL RU sends one or more received UL data packets to the DU directly (without involving the DL RU) or via the DL RU. Depending on conditions of the UL, e.g., the signal-to-noise ratio (SNR) of the UL, the one or more received UL data packets may or may not be the same as the one or more UL data packets sent by the UE. In other words, the one or more received UL data packets may or may not be complete or errorless.

In step 320, the DU processes the one or more received UL data packets and schedules the DL RU to transmit one or more subsequent DL data packets. The one or more subsequent DL data packets may comprise an acknowledgment (ACK) message in response to a successful reception of the one or more UL data packets or an error message in response to an unsuccessful reception of the one or more UL data packets. In one or more embodiments, when one or more UL RU switching criteria are met, the one or more subsequent DL data packets may comprise a subsequent UL resource schedule of UL resource allocation at a second scheduled time slot such that a second UL between the UE and a second UL RU may be established at the second scheduled time slot. The second UL RU may also receive a second timing reference signal for clock recovery and a start of the UL resource allocation at the second scheduled time slot. The UL RU switching criteria may be an error rate of the first UL above an error threshold, a UL latency for the first UL above a UL latency threshold, a SNR of the first UL above a SNR threshold, another UL RU having a distance close to the UE than the first UL RU, etc.

Figure 4:
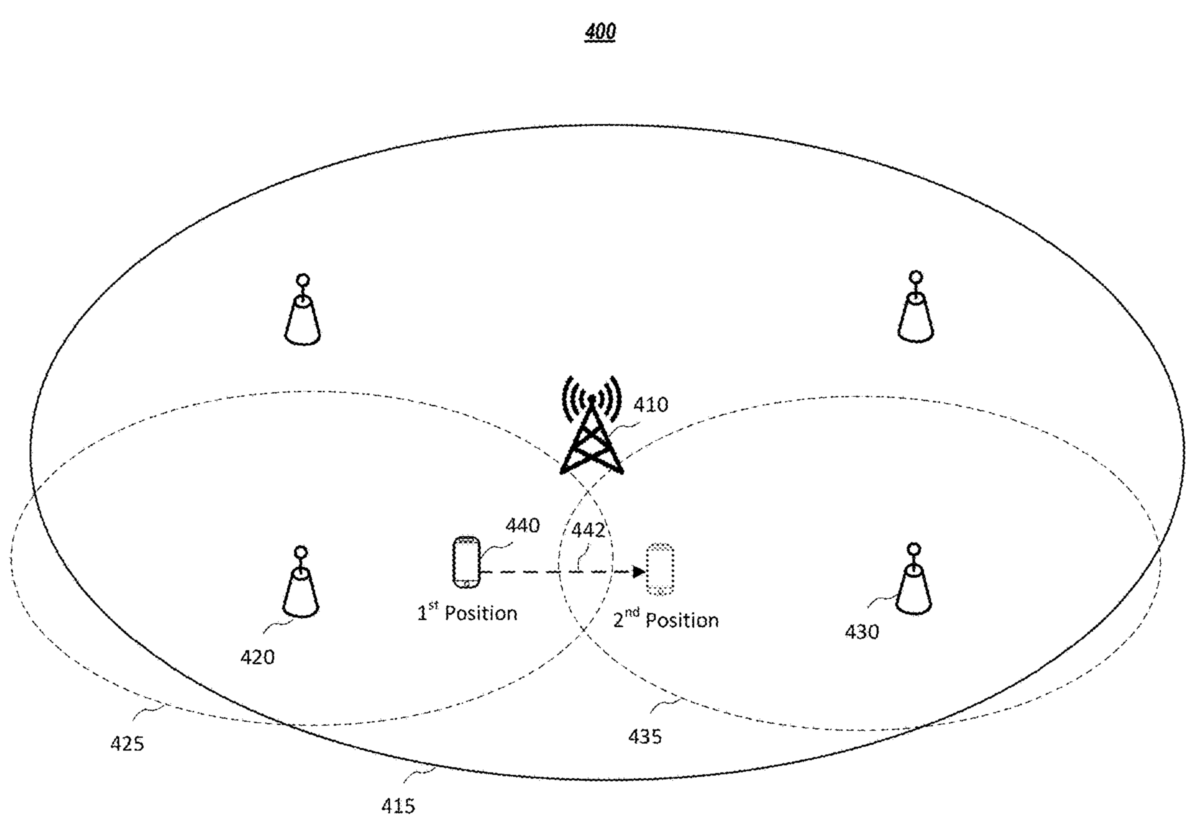
FIG. 4 graphically depicts disaggregated uplink and downlink, according to embodiments of the present disclosure.

FIG. 4 graphically depicts disaggregated uplink and downlink, according to embodiments of the present disclosure. The DL RU 410 has a DL coverage 415 in which a UE 440 may effectively establish a DL link. One or more UL RUs, e.g., 420 and 430, are located within the DL coverage 415 for ULs. The one or more UL RUs couple to a DU (not shown in FIG. 4) through or not through the DL RU 410. The location information of the DL RU 410 and the one or more UL RUs may be available to the DU such that a scheduler in the DU may use the location information for mapping UL traffic to a UL RU.

In one or more embodiments, the UE 440 may be in motion and the DU may re-map UL traffic of the UE 440 to another UL RU. As shown in FIG. 4, the UE 440 may be in motion from a first position, where the UL traffic is mapped to the first UL RU 420. The DU may track a trajectory 442 of the UE 440 and predicts a second position, at which the UL traffic of the UE 440 is re-mapped by a scheduler in the DU to a second UL RU 430. Alternatively, the DU may track a trajectory 442 of the UE 440 and schedule a time slot, based at least one the trajectory 442, to re-map the UL traffic of the UE 440 to a second UL RU 430. The second UL RU 430 may also receive a timing reference signal for clock recovery and a start of the UL resource allocation for UL traffic remapping at the scheduled time slot.

Figure 5:
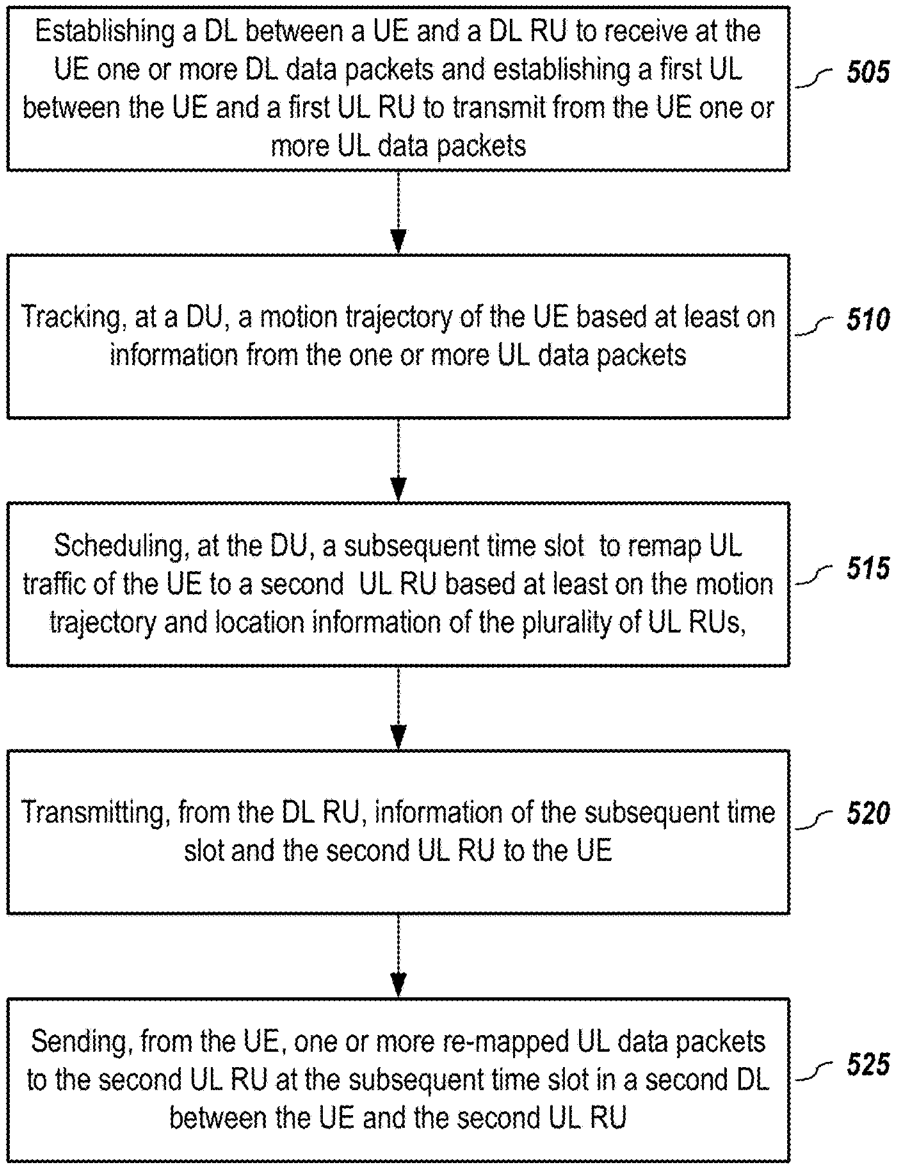
FIG. 5 depicts a process for uplink and downlink scheduling in a RAN, according to embodiments of the present disclosure.

FIG. 5 depicts a process for uplink and downlink scheduling in a RAN, according to embodiments of the present disclosure. In step 505, a UE establishes a DL between the UE and a DL RU to receive one or more DL data packets and establishes a first UL between the UE and a first UL RU to transmit one or more UL data packets. The first UL RU may be selected, by the DU, among a plurality of UL RUs based on one or more parameters. In step 510, the DU tracks a motion trajectory of the UE based at least on information from the one or more UL data packets. For example, to enable accurate positioning measurement, the UE may incorporate a reference signal, e.g., a sounding reference signal (SRS), in the one or more UL data packets for UE positioning in the uplink. The SRS may be used by the UL RU or the DU for UE positioning besides uplink channel quality estimation. The motion trajectory may comprise information of location, speed, direction, etc., of the UE at current and previous time slots.

In step 515, the DU schedules a subsequent time slot, based at least on the trajectory 442 and location information of the plurality of UL RUs, to re-map the UL traffic of the UE 440 to a second UL RU 430 among a plurality of UL RUs. In one or more embodiments, the scheduled subsequent time slot may be determined based on a predicted UE location at the subsequent time slot according to the tracked motion trajectory. The second UL RU 430 may be selected as the nearest UL RU, among the plurality of UL RUs, to the predicted UE location. In step 520, information of the scheduled subsequent time slot and the second UL RU are transmitted to the UE from the DL RU. The information may comprise a location, one or more configurations, e.g., MAC address, physical layer configurations, etc., of the second UL RU. In step 525, the UE sends one or more re-mapped UL data packets to the second UL RU at the subsequent time slot in a second DL between the UE and the second UL RU.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently, including having multiple dependencies, configurations, and combinations.

What is claimed is:

1. A method for disaggregating uplink (UL) and downlink (DL) comprising:

transmitting, from a DL radio unit (RU) in a DL between the DL RU and a user equipment (UE), one or more DL data packets comprising a UL resource schedule of UL resource allocation at a scheduled time slot;

receiving, at a first UL RU via a first UL between the first UL RU and the UE, one or more UL data packets transmitted from the UE during the scheduled time slot, the first UL RU is disaggregated from the DL RU in separate devices, the DL and the first UL are disaggregated, the first UL RU is selected, among a plurality of UL RUs coupled to the DU, by the DU based on one or more parameters for data packet receiving from the UE at the scheduled time slot, the plurality of UL RUs are configured for receiving UL data packets only;

sending, from the first UL RU, the one or more received UL data packets to a distributed unit (DU) that couples to the first UL RU and the DL RU; and processing, at the DU, the one or more received UL data packets and scheduling the DL RU to transmit one or more subsequent DL data packets.

2. The method of claim 1 wherein the first UL RU receives, from the DU, a timing reference signal for clock recovery and a start of the UL resource allocation.

3. The method of claim 1 wherein the one or more parameters are from a group comprising:

a distance between each of the plurality of UL RUs to the UE;

a current UL load for each of the plurality of UL RUs; and a scheduled UL load for each of the plurality of UL RUs.

4. The method of claim 1 wherein the one or more UL data packets comprising a reference signal for UE positioning in the UL.

5. The method of claim 1 wherein the one or more subsequent DL data packets comprising an acknowledgment (ACK) message in response to a successful reception of the one or more UL data packets or an error message in response to an unsuccessful reception of the one or more UL data packets.

6. The method of claim 1 wherein the one or more subsequent DL data packets comprising a subsequent UL resource schedule of UL resource allocation at a second scheduled time slot when one or more UL RU switching criteria are met.

7. The method of claim 6 wherein the one or more UL RU switching criteria are from a group of criteria comprising:

an error rate of the first UL above an error threshold;

a UL latency for the first UL above a UL latency threshold;

a signal-to-noise ratio (SNR) of the first UL above an SNR threshold; and another UL RU having a distance closer to the UE than the first UL RU.

8. A system for disaggregating uplink (UL) and downlink (DL) comprising:

a distributed unit (DU);

a downlink (DL) radio unit (RU) coupled to the DU, the DL RU transmits, via a DL between the DL RU and a user equipment (UE), one or more DL data packets comprising a UL resource schedule of UL resource allocation at a scheduled time slot; and a first UL RU coupled to the DU and disaggregated from the DL RU in separate devices, the first UL RU receives one or more UL data packets transmitted from the UE via a first UL during the scheduled time slot, the DL and the first UL are disaggregated, the first UL RU is selected, among a plurality of UL RUs coupled to the DU, by the DU based on one or more parameters for data packet receiving from the UE at the scheduled time slot, the plurality of UL RUs are configured for receiving UL data packets only;

wherein the DU is configured for processing the one or more UL data packets received at the first UL RU and scheduling the DL RU to transmit one or more subsequent DL data packets.

9. The system of claim 8 wherein the one or more parameters are from a group comprising:

a distance between each of the plurality of UL RUs to the UE;

a current UL load for each of the plurality of UL RUs; and a scheduled UL load for each of the plurality of UL RUs.

10. The system of claim 8 wherein the one or more UL data packets comprising a reference signal for UE positioning in the UL.

11. The system of claim 8 wherein the one or more subsequent DL data packets comprising an acknowledgment (ACK) message in response to a successful reception of the one or more UL data packets or an error message in response to an unsuccessful reception of the one or more UL data packets.

12. The system of claim 8 wherein the one or more subsequent DL data packets comprising a subsequent UL resource schedule of UL resource allocation at a second scheduled time slot when one or more UL RU switching criteria are met.

13. A non-transitory computer-readable medium or media comprising one or more sequences of instructions which, when executed by one or more processors, causes steps to be performed comprising:

transmitting, from a downlink (DL) radio unit (RU) in a DL between the DL RU and a user equipment (UE), one or more DL data packets comprising an uplink (UL) resource schedule of UL resource allocation at a scheduled time slot;

receiving, at a first UL RU, one or more UL data packets transmitted from the UE via a first UL during the scheduled time slot, the first UL RU is disaggregated from the DL RU in separate devices, the DL and the first UL are disaggregated, the first UL RU is selected, among a plurality of UL RUs coupled to the DU, by the DU based on one or more parameters for data packet receiving from the UE at the scheduled time slot, the plurality of UL RUs are configured for receiving UL data packets only;

sending, from the first UL RU, the one or more received UL data packets to a distributed unit (DU) that couples to the first UL RU and the DL RU; and processing, at the DU, the one or more received UL data packets and scheduling the DL RU to transmit one or more subsequent DL data packets.

14. The non-transitory computer-readable medium or media of claim 13 wherein the one or more subsequent DL data packets comprising an acknowledgment (ACK) message in response to a successful reception of the one or more UL data packets or an error message in response to an unsuccessful reception of the one or more UL data packets.

15. The non-transitory computer-readable medium or media of claim 13 wherein the one or more UL data packets comprising a reference signal for UE positioning in the UL.

16. The non-transitory computer-readable medium or media of claim 13 wherein the non-transitory computer-readable medium or media further comprises one or more sets of instructions which, when executed by at least one of the one or more processors, causes steps to be performed comprising:

tracking, at the DU, a motion trajectory of the UE based at least on information from the one or more UL data packets;

scheduling, by the DU, a subsequent time slot to remap UL traffic of the UE to a second UL RU, among a plurality of UL RUs coupled to the DU, based at least on the trajectory and location information of the plurality of UL RUs, the second UL RU is disaggregated from the DL RU;

transmitting, from the DL RU, information of the subsequent time slot and the second UL RU to the UE; and receiving, at the second UL RU, one or more re-mapped UL data packets transmitted from the UE at the subsequent time slot interval in a second DL between the UE and the second UL RU.

17. The non-transitory computer-readable medium or media of claim 16 wherein the subsequent time slot is determined based on a predicted UE location that is predicted according to the motion trajectory, the second UL RU is selected as the nearest UL RU, among the plurality of UL RUs, to the predicted UE location.

* * * * *